United States Patent
Britsch

(10) Patent No.: US 8,837,463 B2
(45) Date of Patent: Sep. 16, 2014

(54) IP MULTIMEDIA SUBSYSTEM (IMS) AND METHOD FOR ROUTING AN HTTP MESSAGE VIA AN IMS

(75) Inventor: Matthias Britsch, Königswinter (DE)

(73) Assignee: T-Mobile International AG & Co. KG, Bonn (DE)

( * ) Notice: Subject to any disclaimer, the term of this patent is extended or adjusted under 35 U.S.C. 154(b) by 649 days.

(21) Appl. No.: 12/600,561

(22) PCT Filed: May 19, 2007

(86) PCT No.: PCT/EP2007/004481
§ 371 (c)(1),
(2), (4) Date: Feb. 3, 2010

(87) PCT Pub. No.: WO2008/141600
PCT Pub. Date: Nov. 27, 2008

(65) Prior Publication Data
US 2010/0150140 A1      Jun. 17, 2010

(51) Int. Cl.
*H04L 12/66*      (2006.01)
*H04L 29/06*      (2006.01)
*H04L 29/08*      (2006.01)

(52) U.S. Cl.
CPC ............. *H04L 65/1016* (2013.01); *H04L 67/02* (2013.01); *H04L 67/306* (2013.01)
USPC ....................................................... 370/352

(58) Field of Classification Search
None
See application file for complete search history.

(56) References Cited

U.S. PATENT DOCUMENTS

| | | | |
|---|---|---|---|
| 6,587,867 B1 * | 7/2003 | Miller et al. | 709/200 |
| 2003/0040280 A1 * | 2/2003 | Koskelainen | 455/67.1 |
| 2003/0204608 A1 * | 10/2003 | Isomaki | 709/229 |
| 2005/0078705 A1 | 4/2005 | Ito | |
| 2007/0159976 A1 * | 7/2007 | Dekeyzer et al. | 370/236 |
| 2008/0247342 A1 | 10/2008 | Gugerell et al. | |
| 2008/0313306 A1 * | 12/2008 | Skog | 709/218 |

FOREIGN PATENT DOCUMENTS

| | | |
|---|---|---|
| DE | 10 2004 030 290 | 2/2006 |
| EP | 1 551 144 | 7/2005 |

OTHER PUBLICATIONS

Richard P. Ejzak et al., "Flexent IMS—The Convergence of Circuit and Packet Core Networks", Bell Laboratories, vol. 2, No. 7, 2002, pp. 105-124.

* cited by examiner

*Primary Examiner* — Minh-Trang Nguyen
(74) *Attorney, Agent, or Firm* — Faegre Baker Daniels LLP

(57) ABSTRACT

An IP Multimedia Subsystem, IMS, for providing a service via a network to at least one subscriber, the system comprising: at least a first proxy function and a first server function for handling messages with a first protocol, a subscriber database connected via a first interface to the server function, at least a second proxy function and a second server function for handling messages with a second protocol, the second server functionally is connected via a second interface to the database.

17 Claims, 2 Drawing Sheets

IP MULTIMEDIA SUBSYSTEM (IMS) AND METHOD FOR ROUTING AN HTTP MESSAGE VIA AN IMS

CROSS-REFERENCE TO RELATED APPLICATION

This application is the U.S. national stage, and claims the benefit under 35 U.S.C. §119 and 35 U.S.C. §365 of International Application No. PCT/EP2007/004481, filed May 19, 2007, the entire disclosure of which is expressly incorporated herein by reference.

FIELD OF THE INVENTION

The present invention relates to an IP Multimedia Subsystem (IMS) and a method for routing a HTTP message via an IMS.

It is described as an extended system architecture for an IP Multimedia Subsystem (IMS) as part of a mobile communications system. In particular the invention describes a protocol extension for an IMS.

BACKGROUND OF THE INVENTION

Subscribers of mobile communication networks of the second and third generation are offered services which require access to special network subsystems, as for example an IP Multimedia Subsystem (IMS).

The 3rd Generation Partnership Project (3GPP) has standardized the IP based multimedia subsystem for UMTS Release 5, cf. "3GPP TS24.228 V5.0.0 (2002-03); Technical Specification Group Core Network (Release 5)". The system provides generic functionalities in order to establish sessions via packet switched access networks, e.g. General Packet Radio Service (GPRS).

IMS as a standard for next generation networks is based on the Session Initiation Protocol (SIP). It provides a control architecture which is able to handle the corresponding messages and sessions. Yet a number of services are based on more than one protocol. Already the first standardised service ever which makes use of IMS, the PoC service (Push-to-talk Over Cellular), includes communication based on the HTTP protocol between a client and the network.

However, IMS does not provide any means to handle protocols other than SIP.

IMS Standard Architecture

IMS consists of a number of two proxies and a registrar for SIP messages. The registrar is connected to a database which stores all information necessary to process a subscriber session in his subscriber profile.

FIG. 1 shows a standard IMS network architecture and the correlated standard IMS flows. A mobile client or subscriber sends a register message (SIP method) to a Proxy Call Session Control Function (P-CSCF) 10. The P-CSCF 10 is the initial interface (SIP Server) between the client and the IMS. The address of the P-CSCF 10 is discovered either as part of the Session Management procedures involved with establishing IP connectivity. That is, the address of the P-CSCF 10 may be provided during a PDP Context Activation process. The P-CSCF 10 forwards the register message to an Interrogating Call Session Control Function (I-CSCF) 12. The I-CSCF 12 is an IMS element that provides a contact point within an operator's network. Allowing subscribers of the network operator, or roaming subscribers to register. The I-CSCF 12 deals will registration, routing and forwarding of SIP messages and charging. The I-CSCF 12 selects the appropriate server function (registrar) that is a Serving Call Session Control Function (S-CSCF) 16 based on a response from a Home Subscriber Server (HSS) 14. The HSS 14 describes the many database functions that are required in next generation mobile networks. These functions include the Home Location Register (HLR), Domain Name Servers (DNS) and security and network access databases HSS. According to the response from the HSS 14 the message is then forwarded to the appropriate S-CSCF 16. The S-CSCF 16 is an IMS element that provides the session control services for a mobile client, which enables the network operator to support the services. Functions include: the management of mobile registrations, maintaining of the session, interaction with other services, charging and security.

The S-CSCF 16 downloads the credentials for authentication of the client from the HSS 14 and uses it, after successful authentication. It also downloads the subscribers profile from the HSS 14. (Response flow directions are not shown in the drawings).

The flow for session invocation is going from the client to the P-CSCF 10, but subsequently to the registrar, S-CSCF 16, which forwards the message to a required application server (AS) or recipient. This is shown in FIG. 2.

After receiving an initial request of a session from the client, the S-CSCF 16 looks up the subscribers profile for matching filter criteria (iFC) and performs the actions related to it in case of positive match.

The Cx interface connecting the I-CSCF 12 and the HSS 14 is the key element in using the subscriber profile for subscriber specific handling of SIP messages or forwarding the messages to specific server instances or B-parties.

At the moment IMS does not provide any means to handle protocols other than SIP.

SUMMARY

It is the object of the invention to provide an IP Multimedia Subsystem IMS which can handle messages other than SIP. The subscriber profile in an IMS system should be extended in a way that the standard profile is usable for non-SIP traffic.

This object is achieved by providing a method and system as described in the independent claims.

Other features which are considered to be characteristic for various forms of the invention are set forth in the dependent claims.

According to the present invention, the IP Multimedia Subsystem, IMS, for providing a service via a network to at least one subscriber, comprises at least a first proxy function and a first server function for handling messages with a first protocol, a subscriber database connected via a first interface to the server function, and, at least a second proxy function and a second server function for handling messages with a second protocol, the second server functionally is connected via a second interface to the subscriber database.

The new IMS architecture is able to handle ubiquitous transmission protocols together with IMS, based on complementary, non-impacting functional extensions of the standard IMS platform, without impacting any processing on the already existing parts.

The extended IMS profile will be interpreted and applied to the according protocol by a new node, which is specific for the new protocol.

In case that the second protocol is a Hypertext Transfer Protocol, HTTP, the second proxy function comprises a Hypertext Transfer Protocol Proxy, HTTP Proxy. Accordingly, the second server function comprises a Hypertext Transfer Protocol controller function, HTTP controller function.

To obtain subscriber information and routing data for a HTTP message the HTTP controller function is connected to a Home Subscriber Server, HSS, via a modified Cx Interface.

The IMS standard procedures will not be affected in any way by the proposed modifications.

PREFERRED EMBODIMENT OF INVENTION

A preferred embodiment of the invention is described with reference to FIG. 3.

In order to enable the standardized mechanism to also handle protocols other than SIP, a control platform, in the following also described as HTTP controller 20, substituting the S-CSCF function has to be implemented. The control platform 20 has to be implemented in the signalling path of the transmission protocol to be integrated into the IMS. In order to allow seamless integration, this control platform 20 has to work on the same subscriber profile database, i.e. on the same HSS 14, as the S-CSCF 16 existing within the SIP path.

Thus, the first step is to integrate the new control platform 20 into the Cx interface.

Figure 1:
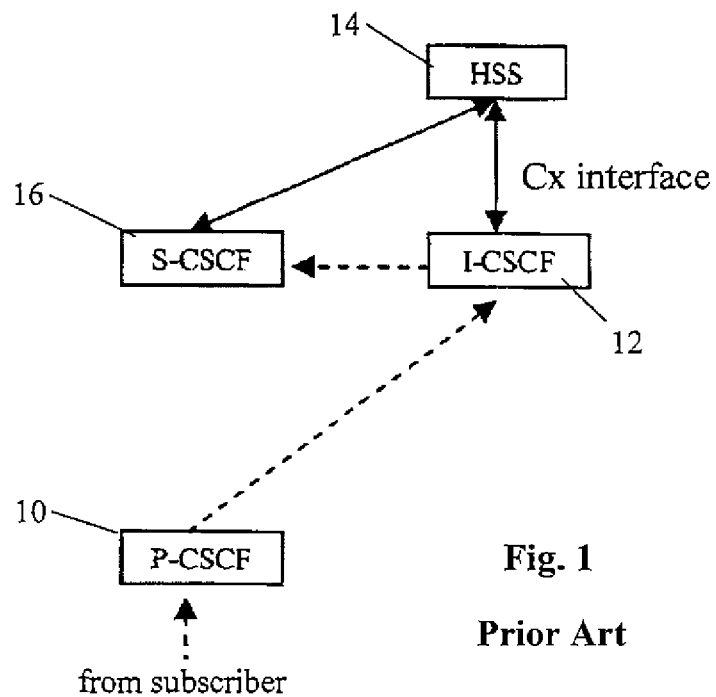
FIG. 1 shows schematically an IMS network architecture and a message flow during registration of a subscriber.
Figure 2:
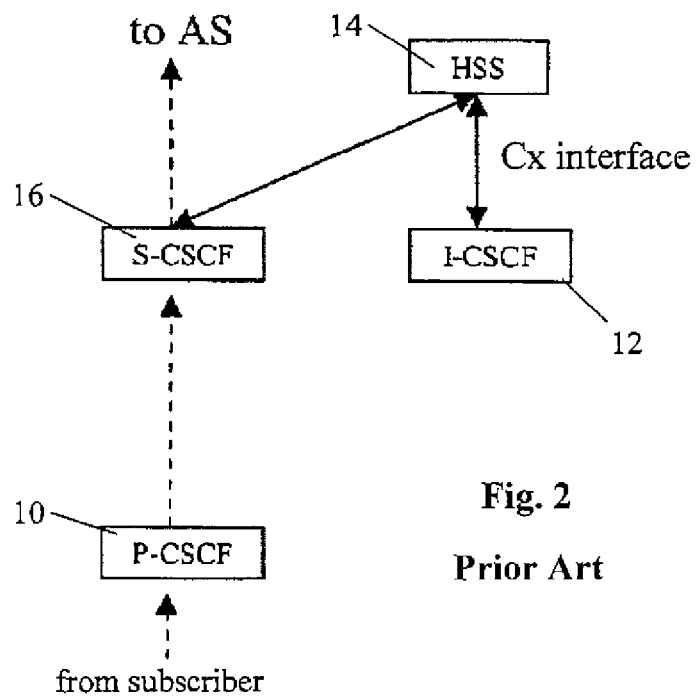
FIG. 2 shows schematically an IMS network architecture and a message flow during a session.
Figure 3:
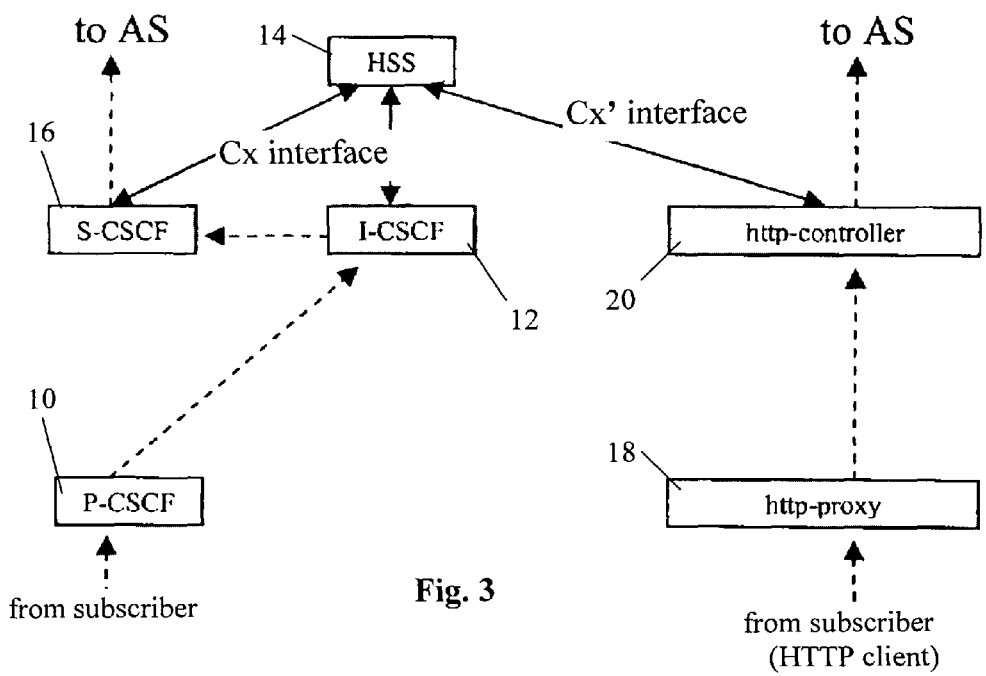
FIG. 3 shows schematically an extended IMS network architecture and a message flow of a non-SIP message.

FIG. 3 shows an additional access path, in this example dedicated to a HTTP protocol transmission. Please note that it could be any other protocol as well, as long as subscriber specific forwarding of the protocol is possible.

FIG. 3 is a schematic view of an extended IMS architecture.

FIG. 3 shows the message flow. A HTTP client sends a message to a HTTP-proxy 18. The HTTP proxy 18 plays the same role as the P-CSCF 10 in case of a SIP based message flow. The HTTP-proxy 18 is representing the overall set of services available in the domain of the operator. The IP address of the HTTP-proxy 18 is resolved against the URL of the operator.

The HTTP proxy 18 forwards the message to the new control node, the HTTP-controller 20. The HTTP-controller 20 requests the subscriber profile from the HSS database 14 and performs an authentication. After successful authentication, the subscriber may send HTTP messages. They are forwarded according to the rules included in the subscriber profile. The HTTP controller 20 communicates with the HSS 14 via a newly implemented modified Cx interface, we call it the Cx' interface. The Cx' interface performs similar tasks as the known Cx interface.

Details of the subscribers profile are included in the following.

Subscriber Profile Integration

The standard subscriber profile stored in the HSS 14 includes a list of initial filter criteria. These filter criteria are used to detect a match and perform appropriate forwarding of a message to a destination application server or B-parties (destination included in the "<Application Server>" attribute). The initial filter criteria are composed of service point triggers.

Initial Filter Criteria (iFC) are provisioned in an IMS subscriber's user profile to specify which conditions require a given application server. For example, in a prepaid calling card scenario, perhaps all calls are routed to a single application server. All standard initial filter criteria are referring to SIP messages and are composed of the following:

Authentication data—the authentication vectors that are used to authenticate a SIP REGISTER request Application Server address—where the application server can be found IFC priority—in the event there is more than one iFC sent in a subscriber's profile, the iFC priority indicates the order for the iFC to be processed A trigger point containing one or more Service Point Triggers (SPTs) (these may be defined in a boolean expression)

Default behaviours in the event the application server is unreachable (either continue parsing the triggers or abandon the dialog altogether)

Any service information that needs to be appended to the message body; this is typically transparent to the HSS and to the SRX and is used by the application server.

According to the invention the existing structure of the initial filter criteria is used. There are included additional session types which are not used in SIP, e.g. HTTP stemming ones as GET or POST and their content, e.g. URLs. The extension of the filter criteria can also include SMPT headers and methods, e.g. DATE, SUBJECT, X-INFO.

Standard Subscriber Profile Example

In the following an example of the standard profile is shown:

```
<InitialFilterCriteria>
    <Priority>50</Priority>
    <TriggerPoint>
        <ConditionTypeCNF>1</ConditionTypeCNF>
        <SPT>
            <ConditionNegated>0</ConditionNegated>
            <Group>0</Group>
            <Method>INVITE</Method>
        </SPT>
    </TriggerPoint>
    <ApplicationServer>
        <ServerName>sip:some.server.net</ServerName>
        <DefaultHandling>0</DefaultHandling>
    </ApplicationServer>
    <ProfilePartIndicator>0</ProfilePartIndicator>
</InitialFilterCriteria>
```

Extended Subscriber Profile Example

In the following an example for a profile including HTTP extensions is given. The Service Point Trigger includes an attribute that is referring to HTTP methods, in this case "GET" and a specific part of the target URL, in this case "eliza".

```
<InitialFilterCriteria>
    <Priority>50</Priority>
    <TriggerPoint>
        <ConditionTypeCNF>1</ConditionTypeCNF>
        <SPT>
            <ConditionNegated>0</Condition Negated>
            <Group>0</Group>
            <Method>GET</Method>
        </SPT>
            <ConditionNegated>1</Condition Negated>
            <Group>1</Group>
            <HTTPHeader>
                <Header>URL</Header>
```

-continued

```
        <Content>"eliza"</Content>
      </HTTPHeader>
    </SPT>
  </TriggerPoint>
  <ApplicationServer>
    <ServerName>HTTP:///:chat.with.eliza.net</ServerName>
    <DefaultHandling>0</DefaultHandling>
  </ApplicationServer>
    <ProfilePartIndicator>0</ProfilePartIndicator>
</InitialFilterCriteria>
```

LIST OF REFERENCE NUMERALS

10 Proxy Call Session Control Function (P-CSCF)
12 Interrogating Call Session Control Function (I-CSCF)
14 Home Subscriber Server (HSS)
16 Serving Call Session Control Function (S-CSCF)
18 HTTP Proxy
20 HTTP Controller

| List of reference numerals | |
|---|---|
| 10 | Proxy Call Session Control Function (P-CSCF) |
| 12 | Interrogating Call Session Control Function (I-CSCF) |
| 14 | Home Subscriber Server (HSS) |
| 16 | Serving Call Session Control Function (S-CSCF) |
| 18 | HTTP Proxy |
| 20 | HTTP Controller |

The invention claimed is:

1. An IP Multimedia Subsystem (IMS) for providing a service via a network to at least one subscriber, comprising:
at least a first proxy function and a first server function for handling messages with a first protocol, wherein the first protocol is a Session Initiation Protocol (SIP),
a subscriber database connected via a first interface including a Cx Interface to the first server function,
at least a second proxy function and a second server function for substituting the first proxy function and the first server function, and for handling messages with a second protocol,
wherein the second server function is implemented into a signalling path of the second protocol and directly connected via a second interface to the subscriber database, the second interface includes a Cx Interface modified to connect to the second server function, wherein in the subscriber database a standard subscriber profile is stored which includes a list of initial filter criteria which are used to detect a match and perform appropriate forwarding of a message to a destination application server, wherein the initial filter criteria include additional session types which are not used in SIP.

2. The IP Multimedia Subsystem IMS of claim 1, wherein the first proxy function comprises a Proxy Call Session Control Function, P-CSCF, and/or an interrogating Call Session Control Function, I-CSCF.

3. The IP Multimedia Subsystem IMS of claim 2, wherein the first server function comprises a Serving Call Session Control Function, S-CSCF.

4. The IP Multimedia Subsystem IMS of claim 2, wherein the first protocol is a Session initiation Protocol, SIP.

5. The IP Multimedia Subsystem IMS of claim 2, wherein the subscriber database includes a Home Subscriber Server, HSS.

6. The IP Multimedia Subsystem IMS of claim 2, wherein the second proxy function comprises a Hypertext Transfer Protocol Proxy, HTTP Proxy.

7. The IP Multimedia Subsystem IMS of claim 1, wherein the first server function comprises a Serving Call Session Control Function, S-CSCF.

8. The IP Multimedia Subsystem IMS of claim 7, wherein the subscriber database includes a Home Subscriber Server, HSS.

9. The IP Multimedia Subsystem IMS of claim 1, wherein the subscriber database includes a Home Subscriber Server, HSS.

10. The IP Multimedia Subsystem IMS of claim 1, wherein the second proxy function comprises a Hypertext Transfer Protocol Proxy, HTTP Proxy.

11. The IP Multimedia Subsystem IMS of claim 1, wherein the second server function comprises a Hypertext Transfer Protocol controller function, HTTP controller function.

12. The IP Multimedia Subsystem IMS of claim 1, wherein the second protocol is a Hypertext Transfer Protocol, HTTP.

13. A method of routing a message via an IP Multimedia Subsystem (IMS) using a transmission protocol other than a Session Initiation Protocol (SIP), the IMS having at least a first proxy function and a first server function for handling messages with a first protocol, the first protocol being a Session Initiation Protocol, and a subscriber database connected via a first interface including a Cx Interface, said method comprising the steps of:
receiving the message at a second proxy function,
sending the message to a control platform comprising a second server function, the second proxy function and the second server function substituting for the first proxy function and the first server function for handling messages with a second protocol associated with the second proxy and server functions, the second server function implementing into a signalling path of the second protocol,
obtaining subscriber information from an IMS subscriber database via a second interface,
forwarding the message from the second server function to a recipient according to rules included in the subscriber information, wherein the second interface includes a Cx Interface modified to directly connect to the second server function, wherein in the subscriber database a standard subscriber profile is stored which includes a list of initial filter criteria which are used to detect a match and perform appropriate forwarding of a message to a destination application server, wherein the initial filter criteria include additional session types which are not used in SIP.

14. The method of claim 13, wherein the second proxy function substitutes a Proxy Call Session Control Function, P-CSCF.

15. The method of claim 13, wherein the second server function substitutes a Serving Call Session Control Function, S-CSCF.

16. The method of claim 13, wherein the subscriber information is obtained from a Home Subscriber Server, HSS, via the modified Cx interface.

17. The method of claim 13, wherein the used transmission protocol is a Hypertext Transfer Protocol, HTTP.

* * * * *